(12) United States Patent
Kondo

(10) Patent No.: US 6,954,815 B2
(45) Date of Patent: Oct. 11, 2005

(54) MICROCOMPUTER WITH UNIVERSAL SERIAL BUS INTERFACE CIRCUIT AND METHOD OF CONTROLLING THE SAME

(75) Inventor: Hideo Kondo, Gunma (JP)

(73) Assignee: Sanyo Electric Co., Ltd., Osaka (JP)

(*) Notice: Subject to any disclaimer, the term of this patent is extended or adjusted under 35 U.S.C. 154(b) by 340 days.

(21) Appl. No.: 10/010,306

(22) Filed: Nov. 8, 2001

(65) Prior Publication Data

US 2002/0059494 A1 May 16, 2002

(30) Foreign Application Priority Data

Nov. 10, 2000 (JP) .................................. P2000-342846
Nov. 10, 2000 (JP) .................................. P2000-342847
Nov. 10, 2000 (JP) .................................. P2000-342848
Nov. 10, 2000 (JP) .................................. P2000-342849

(51) Int. Cl.[7] .......................... G06F 13/10; G06F 9/00
(52) U.S. Cl. ........................... 710/305; 710/8; 710/9; 710/10; 711/103; 711/104
(58) Field of Search ................ 710/8–10, 33, 710/315, 63, 305, 100; 714/23; 711/100, 104, 102, 103, 147; 712/36; 709/220, 221, 250, 226; 370/254, 419

(56) References Cited

U.S. PATENT DOCUMENTS 6,000,042 A * 12/1999 Henrie ........................ 714/40
6,012,103 A * 1/2000 Sartore et al. ................ 710/8
6,073,205 A * 6/2000 Thomson ..................... 711/100
6,192,420 B1 * 2/2001 Tsai et al. ..................... 710/10
6,219,736 B1 * 4/2001 Klingman ................... 710/315

FOREIGN PATENT DOCUMENTS

| JP | A-205412 | 7/1999 | .................... 29/10 |
| JP | 2000-181898 | 6/2000 | |
| WO | WO 99/01820 | 1/1999 | |

OTHER PUBLICATIONS

"New protocol transfer module for USB2.0–to–IEEE 1394 interfaces using synchronous packet control for audio and video data streams" by S. Fujimori, T. sakurai, K. Ikenoya, S. Shinmura and H. Asada (abstract only).*
"FireWire finally cones home" by C. Severance (abstract only).*
Interface, Jan. 1997, pp. 116–131.

* cited by examiner

Primary Examiner—Gopal C. Ray
(74) Attorney, Agent, or Firm—Fish & Richardson P.C.

(57) ABSTRACT

A microcomputer includes a universal serial bus (USB) interface circuit wherein a program is written from a host to the microcomputer at high speed by utilizing a USB cable for connecting the host to a peripheral device. Nonvolatile memory, such as flash ROM, for program storage has a first program area to which program data transmitted from a personal computer is to be written and a second program area storing a write control program. Program data stored temporarily in RAM is written to the first program area of the flash ROM through a USB interface circuit in accordance with the write control program.

15 Claims, 11 Drawing Sheets

MICROCOMPUTER WITH UNIVERSAL SERIAL BUS INTERFACE CIRCUIT AND METHOD OF CONTROLLING THE SAME

BACKGROUND OF THE INVENTION

1. Field of the Invention

The present invention relates to a microcomputer comprising a USB interface circuit and an EEPROM to be a memory for program storage, and more particularly to a microcomputer capable of writing program data to the EEPROM from a host (for example, a personal computer) through the USB interface circuit and carrying out verification.

2. Description of the Related Art

In recent years, the support of a USB (Universal Serial Bus) has been started in order to increase the degree of freedom of extension of a peripheral device in a personal computer, etc. The USB is a serial interface standard which is devised in consideration of the convenience of a user and can be used in common with a communication of various peripheral devices such as a keyboard, a mouse, a camera, a printer, a scanner or a speaker and a personal computer.

Figure 10:
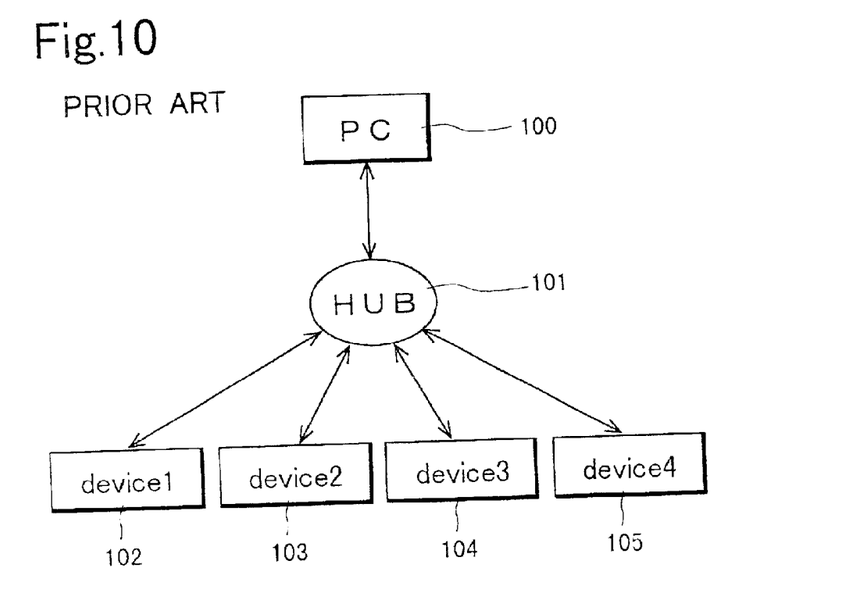
FIG. 10 is a diagram showing an example of the connecting structure of a personal computer and a peripheral device utilizing a USB.

FIG. 10 is a diagram showing an example of the connecting structure of a personal computer and a peripheral device utilizing the USB. An upper personal computer 100 and a hub 101 can be connected to each other through a USB cable, and furthermore, peripheral devices 102 to 105 can be connected to the lower order of the hub 101. The peripheral devices 102 to 105 are managed by the personal computer 100. Thus, the USB is a so-called bi-directional communicatable serial bus having a network structure of a multi-star type.

The USB cable includes four signal lines. Two of them are used for a power source and the others are used for a data signal. The data signal is basically treated as a differential signal ($D^+$, $D^-$). Moreover, data transfer utilizing the USB is subjected to time sharing on the concept that a transfer unit is a frame, and is carried out by superposing the frame. One frame starts with an SOF (Start Of Frame) packet. The personal computer of a host sequentially transmits a data transfer request token (a data input request sent from a keyboard or a camera and a request for outputting voice data) scheduled within the started frame in advance, thereby carrying out data transfer together with a plurality of peripheral devices at the same time.

Examples of a document for technology of the USB include "Interface" (January, 1997) and JP-A-11-205412.

The peripheral device usually has a microcomputer for controlling the operation of the device mounted thereon. Here, it is assumed that an EEPROM to be a nonvolatile memory capable of electrically carrying out rewrite, read and erase is provided as a memory for program storage in the microcomputer. The EEPROM also includes a flash ROM having the function of batch erasing program data in addition to the function described above.

Conventionally, in the case in which the program data are to be written to the EEPROM, two methods have been employed. In the following, a microcomputer comprising a flash ROM as a memory for program storage will be described as an example.

Figure 11:
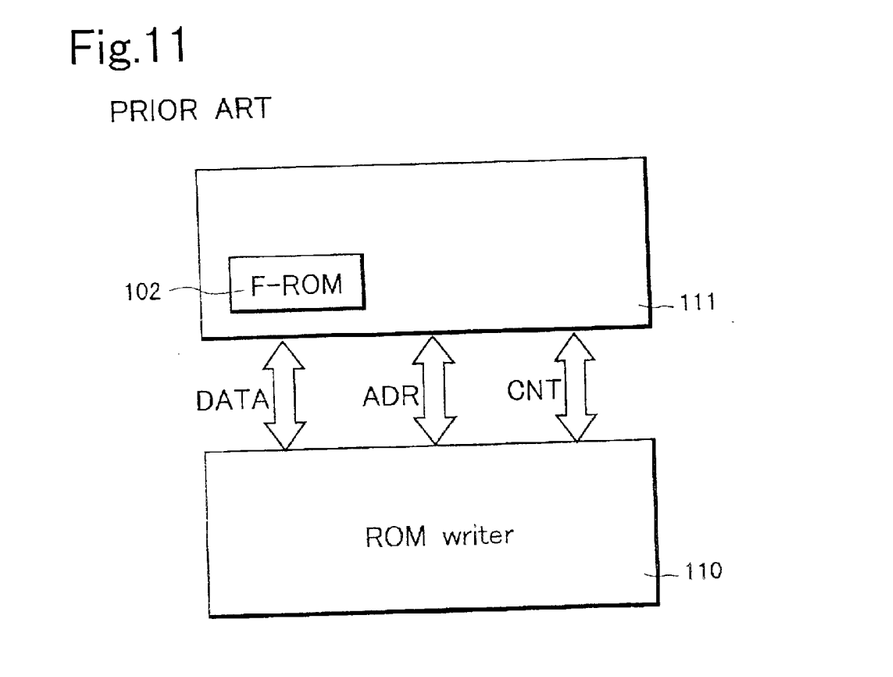
FIG. 11 is a diagram showing a method of writing program data to a flash ROM according to a conventional art.

As one of the methods, data are written, in parallel, to a flash ROM 112 provided in a microcomputer 111 by using a ROM writer 110 as shown in FIG. 11. For example, the 8-bit microcomputer 111 requires eight data signal lines, sixteen address signal lines and three control signal lines (a chip enable signal, a write enable signal and a read enable signal).

Figure 12:
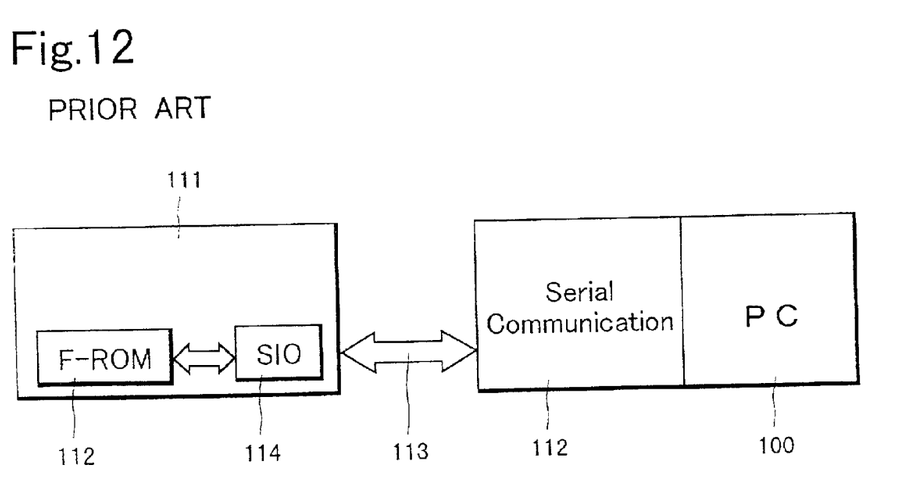
FIG. 12 is a diagram showing the method of writing program data to a flash ROM according to the conventional art.

In many cases, moreover, the program data to be written to the flash ROM 112 are present in a predetermined file format such as a hexafile in a personal computer 100. As a second method, in the case in which the program data are to be written from the personal computer 100 to the flash ROM 112, a connection to the microcomputer 111 is carried out through a serial signal line 113 by using a serial communication unit 115 (RS232C, etc.) provided along with the personal computer 100 as shown in FIG. 12.

Moreover, an SIO (Serial Input/Output) circuit 114 is provided in the microcomputer 111 and an SIO control program for operating the SIO circuit 114 is previously written to the predetermined area of the flash ROM 112. When the program data are transferred from the personal computer 100 through the serial signal line 113, the SIO circuit 114 carries out a writing operation to the flash ROM 112 in accordance with the SIO control program. However, the system structure requires a special external circuit and a special communication software, for example, the SIO circuit 114 and the serial communication unit 115 (RS232C).

As described above, conventionally, in the case in which the program data are to be written to the flash ROM to be the memory for program storage which is provided in the microcomputer, the number of the signal lines is increased if the program data are written in parallel and a special external circuit and a special communication software are required if the program data are written serially.

Further, in the process for the initialization of a USB, address data are allocated to each device in order to specify a device from the host side and identification information (hereinafter referred to as a vendor ID) for specifying the provider of the device from the device side to the host side and the vendor ID is collated in the host. The vendor ID is registered and issued in an institution of UIF (USB Implemental Forum). Accordingly, it has been necessary to hold the vendor ID on the device side. However, an optimum holding method for the device has not been conventionally investigated sufficiently.

SUMMARY OF THE INVENTION

In the present invention, therefore, program data are written from a host (a personal computer) to a flash ROM provided in a microcomputer by exactly utilizing a USB cable provided in an environment in which the host (the personal computer) and a peripheral device are connected to each other and a bi-directional communication can be carried out, and the USB cable is used for the bi-directional communication according to an original object after the program data are written. Consequently, a special serial line, a special external circuit and a special communication software are not required.

Further, the present invention provides a microcomputer capable of efficiently holding identification information for specifying a provider and of smoothly collating the vendor ID on the host side.

The invention provides a microcomputer comprising a USB interface circuit for interfacing data transmission and receipt between a host and the microcomputer, a nonvolatile memory for program storage which can electrically carry out rewrite and read, a data memory for temporarily storing program data transmitted from the host which are parallel converted by the USB interface circuit, and a CPU for executing a program instruction read from the nonvolatile memory, wherein the nonvolatile memory for program storage has a first program area storing a write control program and a second program area to which the program data are to be written, and the program data stored temporarily in the data memory are written to the second program area in accordance with the write control program stored in the first program area.

Consequently, it is possible to write the program data from the host to the microcomputer at a high speed by utilizing a USB cable.

Moreover, the microcomputer further comprises a program counter for controlling an address of the nonvolatile memory for program storage, a value of the program counter being caused to jump to a starting address of the first program area in response to a reset of the microcomputer. Consequently, it is possible to reliably start the write control program in response to the reset of the microcomputer.

Furthermore, the data memory is a RAM. The reason is that the RAM provided in a general purpose microcomputer is to be utilized effectively.

Moreover, the RAM is accessible from the USB interface circuit and the CPU. The reason is that the RAM is to be utilized effectively.

Furthermore, the microcomputer further comprises an address selecting circuit for selecting a first address signal output from the USB interface circuit and a second address signal output from the CPU and inputting the address signal to an address decoder of the RAM, a data area of the RAM being accessible from the USB interface circuit and the CPU.

Moreover, the address selecting circuit selects the first address signal output from the USB interface circuit during receipt of data from the host. Consequently, the receipt of data from the host can be carried out with priority and the data can be received reliably.

Furthermore, a microcomputer comprises a USB interface circuit for interfacing data transmission and receipt between a host and the microcomputer, a nonvolatile memory for program storage which can electrically carry out rewrite and read, and a CPU for executing a program read from the nonvolatile memory, wherein a specific memory area for storing identification information to specify a provider of the microcomputer is provided in the nonvolatile memory and the identification information read from the specific memory area is transmitted to the host through the USB interface circuit during initialization of a USB.

Consequently, the identification information for specifying the provider of the microcomputer can be held efficiently and the collation of the identification information on the host side can be carried out smoothly.

DESCRIPTION OF THE PREFERRED EMBODIMENTS

Figure 1:
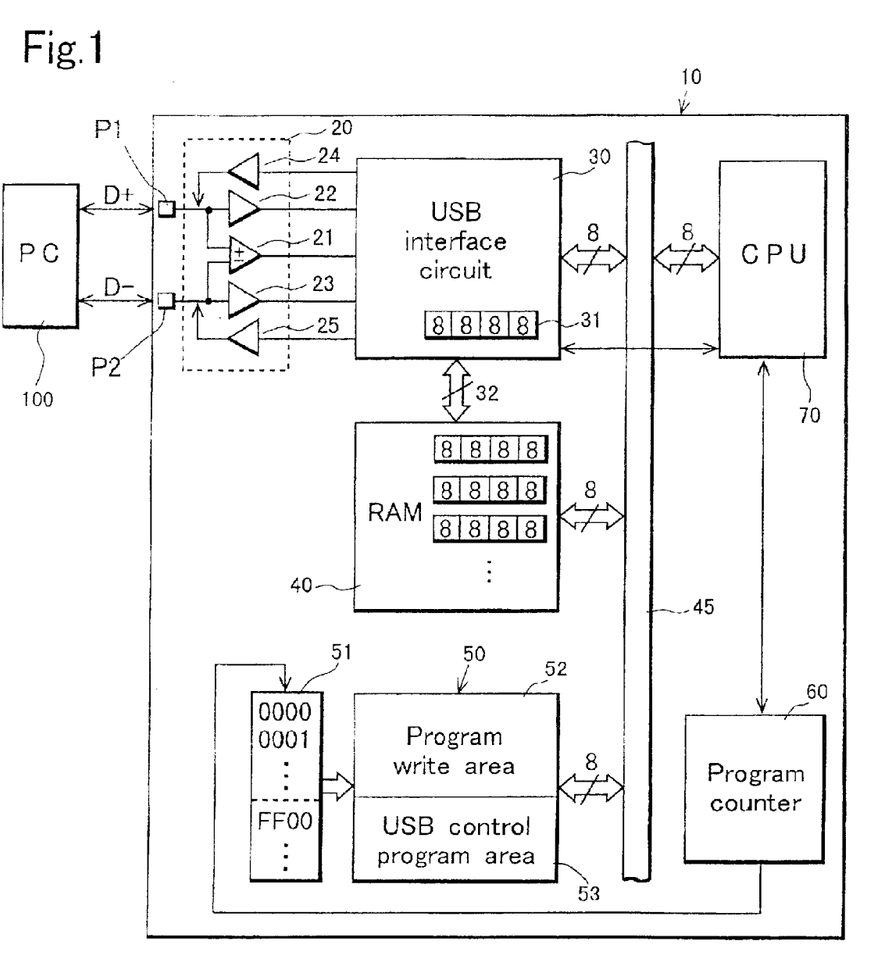
FIG. 1 is a block diagram showing a microcomputer according to an embodiment of the invention.

A first embodiment of the invention will be described with reference to the drawings. FIG. 1 is a block diagram showing the structure of a microcomputer according to the embodiment of the invention.

Assuming that a microcomputer 10 has an 8-bit structure, description will be given. The microcomputer 10 and a personal computer 100 are connected to each other through a pair of differential signal lines. USB data, that is, USB differential signals ($D^+$, $D^-$) are input and output through terminals P1 and P2 of the microcomputer 10. The USB differential signals ($D^+$, $D^-$) are serial data signals complying with a USB communication protocol.

The reference numeral 20 denotes an input/output circuit connected to the terminals P1 and P2 which is constituted by a differential input buffer 21, input buffers 22 and 23 and output buffers 24 and 25. The input buffers 22 and 23 are provided in consideration of the case in which the USB differential signals ($D^+$, $D^-$) are brought into a state of (L, L)

A USB interface circuit 30 provided in the microcomputer 10 serves to interface data transmission/receipt to/from the personal computer 100. During the data receipt, particularly, various data processings are carried out upon receipt of the USB differential signals ($D^+$, $D^-$) sent from the input/output circuit 20. The USB interface circuit 30 extracts necessary data from the serial data signal. At this time, the USB interface circuit 30 decides the transfer format of the serial data signal and carries out an error signal processing, etc. Moreover, the USB interface circuit 30 converts a serial signal subjected to the data processing into a parallel signal having a predetermined form at which can be processed by the microcomputer 10 (for example, an 8-bit structure).

Furthermore, the USB interface circuit 30 includes a temporary register 31 for temporarily storing program data having 8 bits×4=32 bits which are parallel converted, and a control register (not shown). Various data (address data to be allocated to the device, etc.) to be managed by the personal computer 100 to be a host are set to the control register.

The USB interface circuit 30 carries out an entirely reverse data processing (a conversion from parallel data into serial data) to that described above during the transmission of data from the microcomputer 10 to the personal computer 100.

A RAM 40 is utilized for temporarily storing program data having a 32-bit unit which are successively transferred from the data of the temporary register 31 of the USB interface circuit 30. In order to carry out the data transfer between the USB interface circuit 30 and the RAM 40, 32 dedicated signal lines are provided. When program data stored in the RAM 40 reach a predetermined amount (for example, 128 bytes), 128-byte program data are transferred through a bus 45 of the microcomputer 10 to a flash ROM 50.

To the contrary, the program data written to the flash ROM 50 can be transferred to the RAM 40 and the program data stored in the RAM 40 can be transferred to the temporary register 31 of the USB interface circuit 30.

According to the USB communication, generally, a large amount of data are transmitted from the personal computer 100 to the device side. Therefore, a special data buffer is provided on the device side.

On the other hand, the invention is also characterized in that it employs such a structure that the RAM 40 originally provided as a data memory in the microcomputer 110 is utilized for temporarily storing data through the USB communication, thereby effectively utilizing the data memory.

Figure 2:
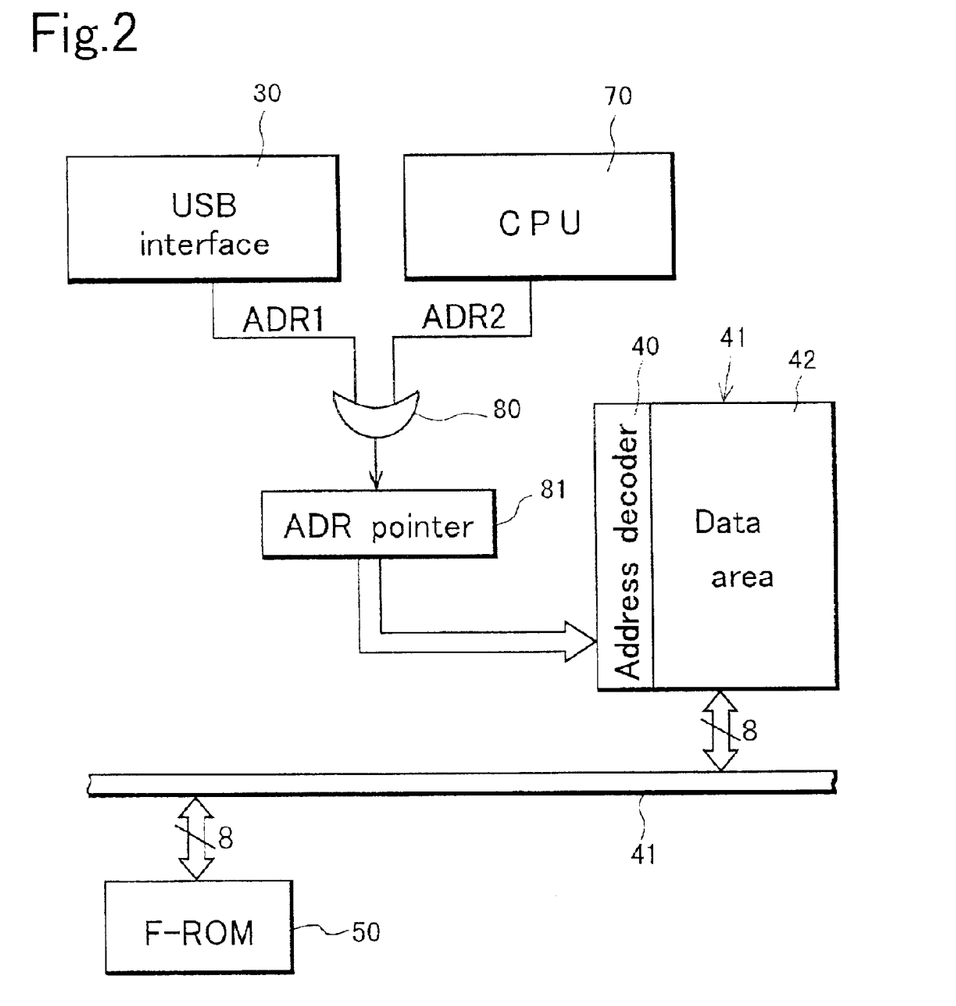
FIG. 2 is a block diagram showing a RAM of the microcomputer and a peripheral circuit according to the embodiment of the invention.

FIG. 2 is a block diagram showing the RAM 40 and a peripheral circuit. An address signal ADR1 is output from the USB interface circuit 30 and an address signal ADR2 is output from a CPU 70, and they are input to an address selecting circuit 80. The address selecting circuit 80 selects either of the address signals ADR1 and ADR2 and inputs the address signal to an addressing circuit 81.

Then, the output of the addressing circuit 81 is input to an address decoder 41 and the same data area is constituted to be accessible in response to either of the address signals ADR1 and ADR2.

According to the structure described above, a data area 42 of the RAM 40 can be utilized as a data memory area to be controlled by the CPU 70 if the address signal ADR2 is selected, and can also be utilized as a data memory area for temporarily storing program data (a 32-bit unit) from the USB interface circuit 30 if the address signal ADR1 is selected. More specifically, the data area of the RAM 40 is accessible from both the CPU 70 and the USB interface circuit 30.

For the address selection, the address signal ADR1 sent form the USB interface circuit 30 is selected during the data transmission/receipt to/from the personal computer 100. This is based on the characteristic of the USB in which the data transfer from the personal computer 100 cannot be interrupted in the middle. More specifically, the microcomputer 10 is automatically set to a wait (standby) state based on a signal detecting that the temporary register 31 of the USB interface circuit 30 is brought into a full state.

In FIG. 1, moreover, the reference numeral 50 denotes a flash ROM divided into a first program area 53 in which a USB control program (more specifically, a write control program) is previously written and stored, and a second program area 52 to which program data transmitted from the personal computer 100 are written through the RAM 40. The first program area 53 is subjected to write protect such that rewrite cannot be carried out. The flash ROM 50 is constituted by an electrical writable, readable and erasable EEPROM. Moreover, the "flash" implies that batch erasure can be carried out in a memory block unit.

The reference numeral 60 denotes a program counter and an output thereof is applied to an address decoder 51 of the flash ROM 50. The output value of the program counter 60 jumps to a predetermined address in response to an instruction sent from the CPU 70 according to the state of the USB communication as will be described later. More specifically, the program counter 60 jumps to an address FF00 to be the starting address of the first program area 53 (the write control program) when the program data transmitted from the personal computer 100 are to be written, and jumps to an address 0000 to be the starting address of the second program area 52 after the program data are written. Then, the CPU 70 executes the operation of the microcomputer 10 in accordance with a program instruction read from the flash ROM 50.

Next, an example of the operation of the microcomputer 10 will be described with reference to a flow chart of FIG. 3. First of all, the microcomputer 10 is connected to the USB cable at a first step 200. At this time, the microcomputer 10 is turned on by the power line of the USB cable so that the microcomputer 10 is reset by power-on reset.

At a step 201, subsequently, the value of the program counter 60 jumps to the address FF00 to be the starting address of the first program area 53 (write control program). Accordingly, the microcomputer 10 then executes the following processing in accordance with the write control program.

When the microcomputer 10 is connected to the USB cable at the step 201 as described above, the USB differential signals ($D^+$, $D^-$) are changed from (L, L) to, for example, (H, L) through a pull-up resistor provided on the microcomputer 10 side. By the change of the USB differential signals ($D^+$, $D^-$), the personal computer 100 detects that the microcomputer 10 is connected to a USB network and issues a USB bus reset signal after a predetermined time. At a step 202, the microcomputer 10 is at a USB bus reset signal waiting state.

At a step 203, it is decided whether or not the USB bus reset signal is received. If the decision is NO, the waiting state is maintained. If the decision is YES, the processing proceeds to a next step 204.

At the step 204, the initialization of the USB is carried out by enumeration. The enumeration generally implies a series of software processings of setting an environment in which USB data can be transmitted and received between the microcomputer 10 and the personal computer 100.

A main processing to be carried out by the enumeration includes the initialization of the personal computer 100 and the allocation of an address to a device controlled by the personal computer 100. In the latter processing, a specific address allocated by the personal computer 100 is stored in a control register (an address register) in the USB interface circuit 30. Consequently, the microcomputer 10 collates an address in a USB packet transmitted from the personal computer 100 with an address in the address register. Only when they are coincident with each other, the USB data thus transmitted are processed.

When the environment in which the transmission and receipt of the USB data can be carried out is thus set completely, program data to be written to the flash ROM are input in the form of USB differential signal data ($D^+$, $D^-$) from the personal computer 100 at a step 205.

At a step 206, the USB differential signal data ($D^+$, $D^-$) thus input are subjected to a data processing by the USB interface circuit 30. The data processing has the contents described above and mainly includes a processing of converting serial data (8 bits×4) into predetermined parallel data (32 bits).

At a step 207, the program data parallel converted are written from the USB interface circuit 30 to the RAM 40.

Then, when the amount of the program data written to the RAM 40 reaches a predetermined amount (for example, 128 bytes), write from the RAM 40 to the second program area 52 of the flash ROM 50 through the bus 45 is started by using the predetermined amount as a unit (step 208). The flash ROM 50 is divided into a plurality of blocks and 128 bytes constitute each block. Accordingly, the amount of data storage of the RAM 40 can be properly selected depending on the block structure of the flash ROM 50.

Actually, the operation for writing the parallel converted program data from the USB interface circuit 30 to the RAM 40 and the operation for writing the data from the RAM 40 to the flash ROM 50 are carried out in parallel. Thus, a high-speed write can be realized.

At the step 208, the write to the flash ROM is started and requires a predetermined time. At a step 209, the microcomputer 10 is set into a NACK state on a software basis. This is a kind of handshake packet of the USB packet and is returned to the personal computer 100 in order to give a notice that data transmitted from the personal computer 100, being the host, cannot be accepted.

At a step 210, it is decided whether or not the write is ended or not. If the result of the decision is NO, the NACK state is maintained. If the result of the decision is YES, the microcomputer 10 is set to an ACK state. ACK is returned to the personal computer 100 in order to give a notice that the data can be accepted on the microcomputer 10 side.

At a next step 212, subsequently, it is decided whether or not the write of the program data to the flash ROM 50 is completely ended. If the result of the decision is NO, the processing returns to the step 205 and the write of residual program data is continuously carried out. The write of the program data is carried out in a unit of a block (page) (for example, 128 bytes). Therefore, the processing is repeated until all pages are written.

If the result of the decision is YES, the value of the program counter 60 jumps to the address 0000 to be the starting address of the second program area 52. Then, the microcomputer 10 reads the program data supplied from the personal computer 100 and the CPU 70 starts to execute the operation of the microcomputer 10 based on a interpreted program instruction.

While the case in which the program data are written from the personal computer 100 to the flash ROM 50 of the microcomputer 10 has been described in the embodiment, it is also possible to read the program data written to the flash ROM 50 and to return the read program data to the personal computer 100, there by carrying out verification. In that case, the order of a data processing is reverse to that of the order described above.

More specifically, the program data read from the flash ROM 50 are temporarily stored in the RAM 40 and are then transferred successively to the USB interface circuit 30. Subsequently, a reverse data processing to that of the write is carried out in the USB interface circuit 30 and parallel data are converted into predetermined serial data format, and the serial data thus obtained are then transmitted to the personal computer 100 through the USB cable.

Moreover, while the second program area to write the program data is set in an empty state on an initial condition in the embodiment, it is not restricted but the invention can be similarly applied to the rewrite of a program with the upgrade of the program version.

As described above, according to the embodiment, the program can be written from the host (for example, the personal computer) to the microcomputer at a high speed by utilizing the USB cable for connecting the host to the peripheral device.

Furthermore, since the USB is utilized for the transfer of the program, the special serial line, external circuit and communication software are not required.

Moreover, there is also an advantage that a special data buffer is not required by utilizing the data area of the RAM of the microcomputer as the data memory for temporarily storing the program data.

Figure 4:
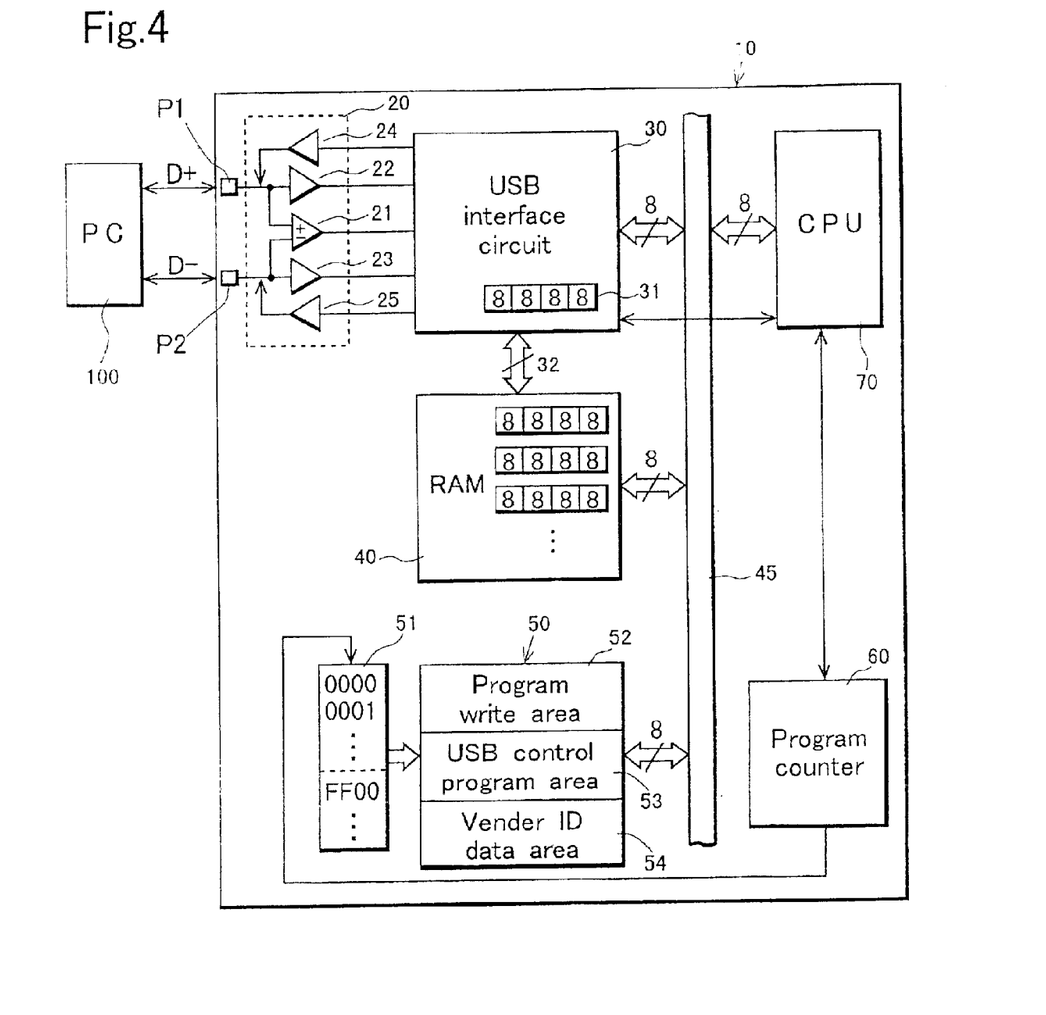
FIG. 4 is a block diagram showing a microcomputer according to a second embodiment of the invention.

Next, description will be given to a microcomputer according to a second embodiment of the invention. FIG. 4 is a block diagram showing the structure of the microcomputer according to the second embodiment of the invention. The second embodiment is different from the first embodiment in that a flash ROM 50 has a different structure. As described above, the flash ROM 50 includes a first program area 53 in which USB control programs (a USB initialization program and a program data write control program) are previously written and stored and a second program area 52 to which program data transmitted from a personal computer 100 are written through a RAM 40.

According to the embodiment, a vendor ID data area 54 is further provided adjacently to the first program area 53. The vendor ID data area 54 includes identification information data for specifying the vendor of the microcomputer. While the vendor ID data area 54 may be provided in any address region in the flash ROM, an address thereof is to be specified.

Figure 5:
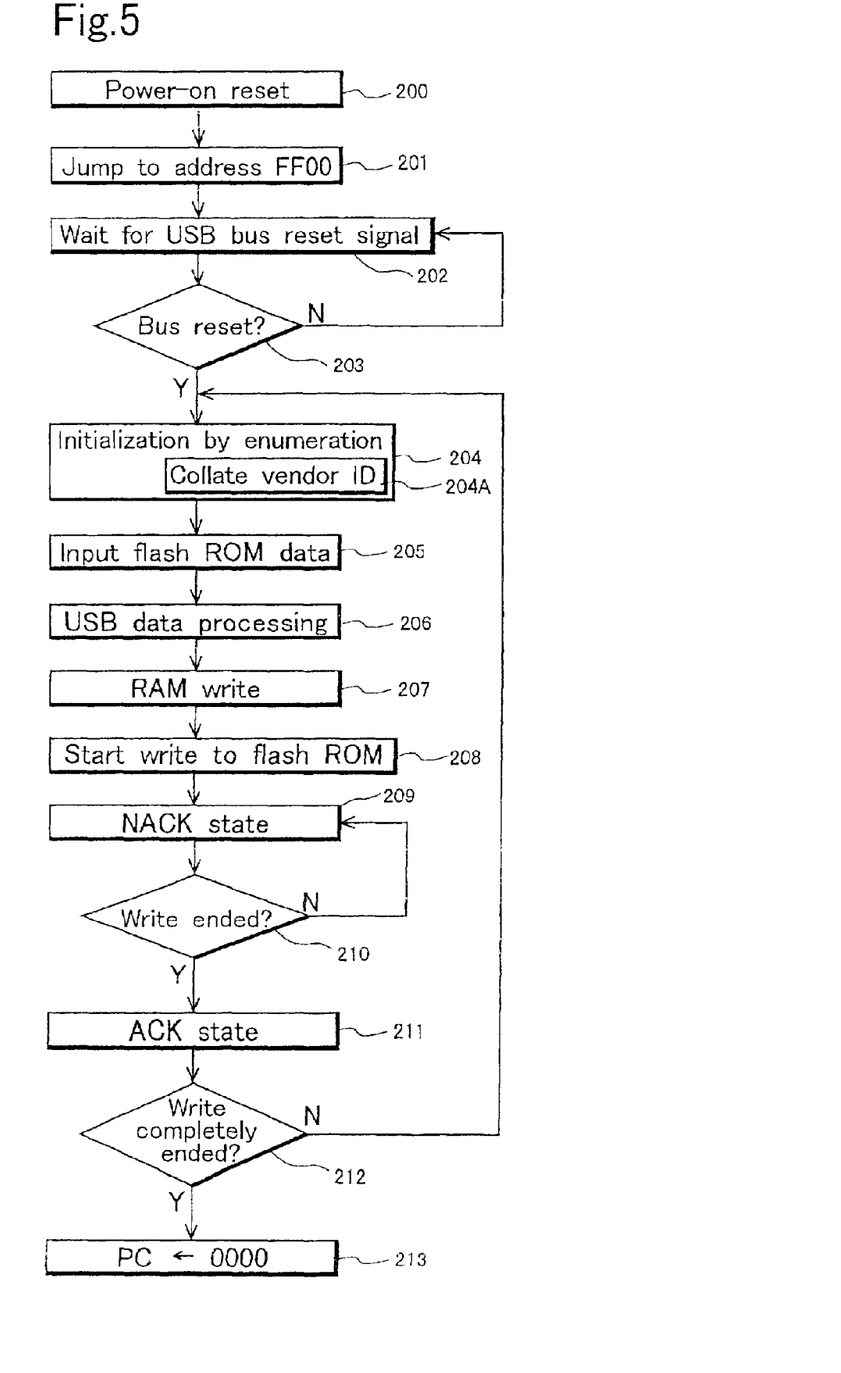
FIG. 5 is a flowchart showing the operation of a microcomputer 10 according to the second embodiment of the invention.

The operation of the microcomputer 10 according to the embodiment will be described with reference to a flow chart of FIG. 5. Since the same operation as that of the first embodiment is carried out at steps 200 to 203, description will be omitted.

At a step 204, the USB is initialized by enumeration. While a main processing to be carried out by the enumeration includes the initialization of the personal computer 100 and the allocation of an address to a device controlled by the personal computer 100, the collation of the vendor ID is carried out in addition thereto in the embodiment. In the collation of the vendor ID (step 204A), vendor ID data are read from a vendor ID data area 54 of the flash ROM 50 and are transmitted to the personal computer 100 through the USB interface circuit 30. Whether the vendor ID data are normally registered is collated on the personal computer 100 side.

Moreover, the microcomputer 10 stores a specific address allocated by the personal computer 100 into a control register (an address register) in the USB interface circuit 30. Consequently, the microcomputer 10 collates an address in a USB packet transmitted from the personal computer 100 after the initialization of the USB with an address in the address register. Only when they are coincident with each other, the USB data thus transmitted are processed.

When the environment in which the transmission and receipt of the USB data can be carried out is thus set completely, the program data to be written from the personal computer 100 to the flash ROM are input in the form of the USB differential signal data (D$^+$, D$^-$) at a step 205.

Since the same processing as that of the first embodiment is carried out at subsequent steps 205 to 213, description will be omitted.

According to the embodiment, thus, the specific memory area for storing the identification information (vendor ID) to specify the vendor of the microcomputer is provided in the nonvolatile memory included in the microcomputer and the identification information read from the same memory area is transmitted to the host during the initialization of the USB. Therefore, the identification information can be held efficiently and the collation of the identification information can be smoothly carried out on the host side.

Figure 6:
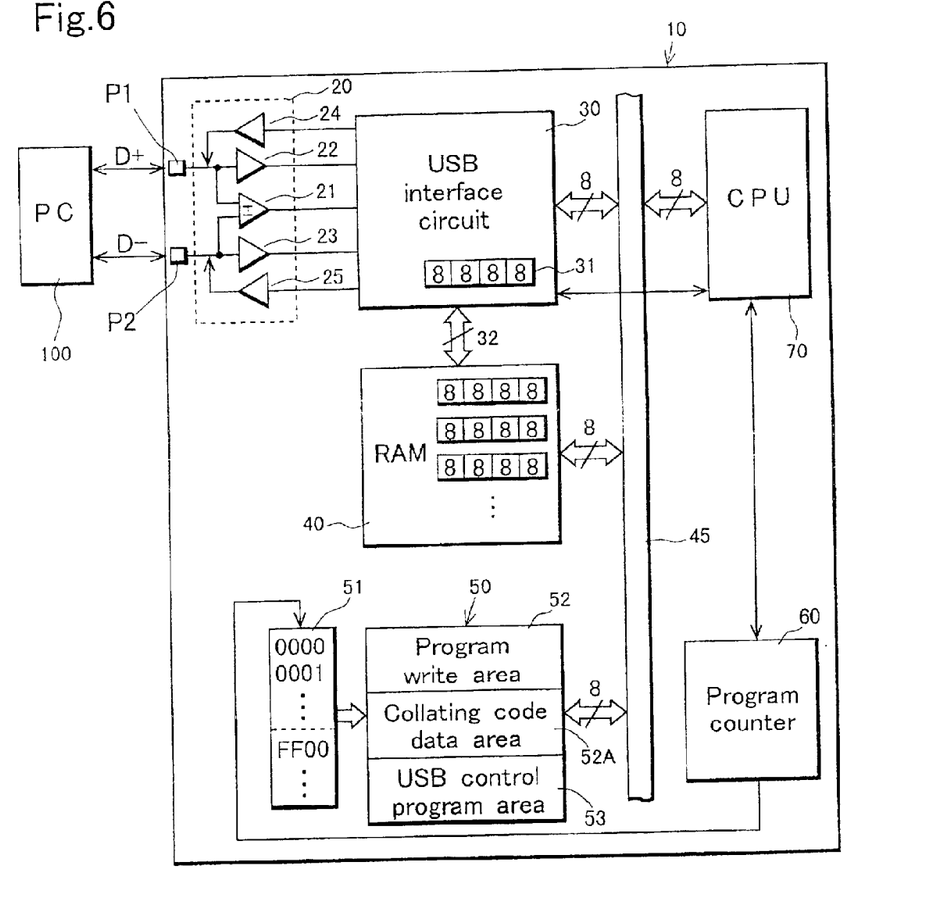
FIG. 6 is a block diagram showing a microcomputer according to a third embodiment of the invention.

Next, description will be given to a microcomputer according to a third embodiment of the invention. FIG. 6 is a block diagram showing the structure of the microcomputer according to the third embodiment of the invention. The third embodiment is different from the first embodiment in that a flash ROM 50 has a different structure. As described above, the flash ROM 50 is divided into a first program area 53 in which a USB control program (a write control program) is previously stored and a second program area 52 to which program data transmitted from a personal computer 100 are written through a RAM 40.

In the embodiment, a collating code data area 52A is provided in a part of the second program area 52. Collating code data are written to the collating code data area 52A after the program data transmitted from the personal computer 100 are written in accordance with the write control program of the first program area 53.

The collating code data have a data volume of 128 Kbytes, for example, and are previously written to a part of the first program area 53. Alternatively, the collating code data may be transmitted from the personal computer 100 together with the program data.

In the case in which the data of the collating code data area 52A are coincident with the collating code data which are previously stored in a part of the first program area 53, the microcomputer recognizes that the program data have already been written and executes the same program data without initializing a USB again.

On the other hand, in the case in which the data of the collating code data area 52A are not coincident with the collating code data which are previously stored in a part of the first program area 53, an operation for writing the program data is started after the initialization of the USB.

As described later, consequently, the convenience of a user can be enhanced for the loading and execution of a program.

Next, a method of controlling the microcomputer 10 will be described with reference to a flow chart of FIG. 7.

As described in the first embodiment, at a first step 200, the microcomputer 10 is connected to a USB cable. At this time, when the microcomputer 10 is turned on through the power line of the USB cable, the microcomputer 10 is reset by a power-on reset circuit provided in the microcomputer 10.

At a step 201, next, a write control program is started. At this time, the value of a program counter 60 jumps to an address FF00, the starting address of the first program area 53. Accordingly, the microcomputer 10 then executes the following processing in accordance with the write control program.

At a step 204, the USB is initialized by enumeration.

Consequently, when the environment in which the transmission and receipt of the USB data can be carried out is set completely, the program data transmitted from the personal computer 100 are loaded at a step 215.

Figure 3:
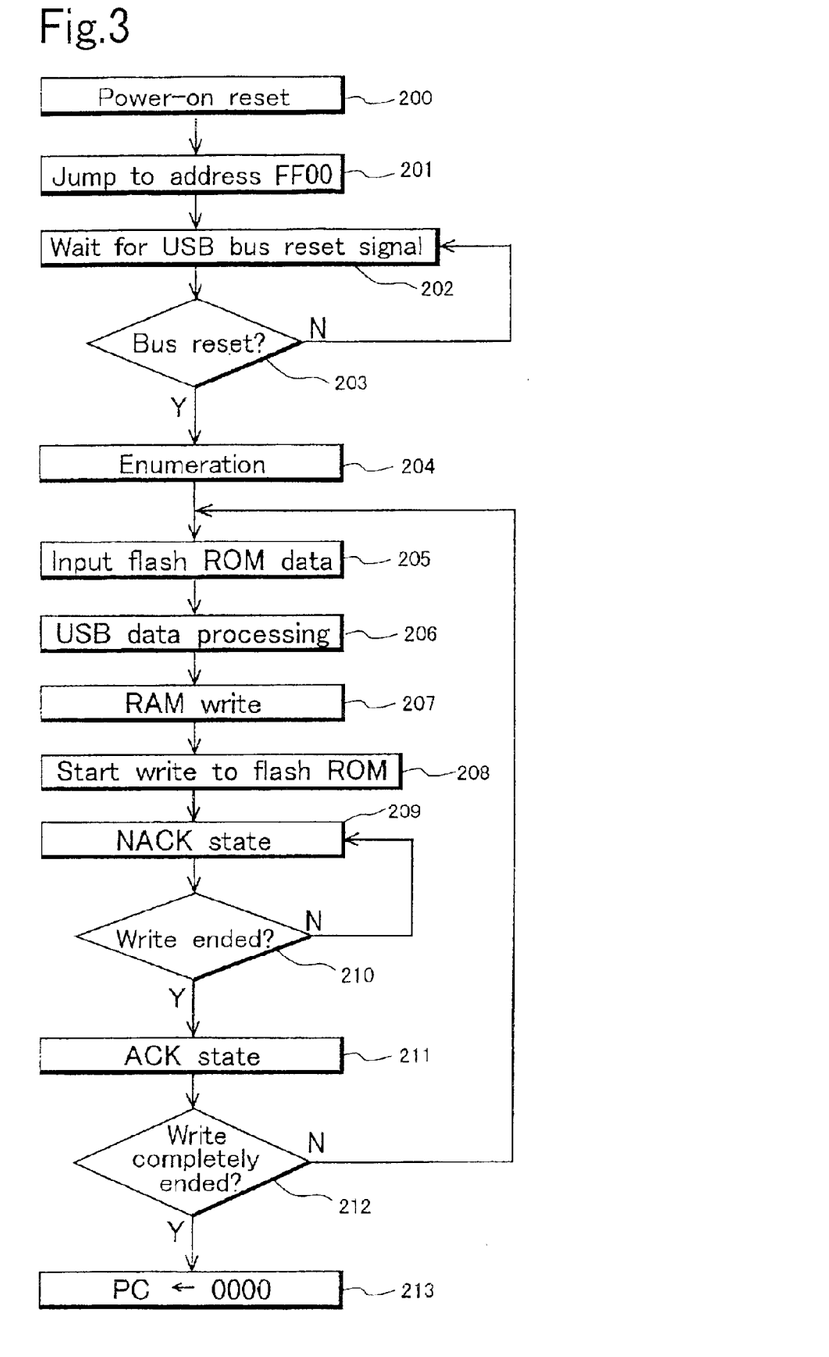
FIG. 3 is a flowchart showing the operation of a microcomputer 10 according to the embodiment of the invention.
Figure 8:
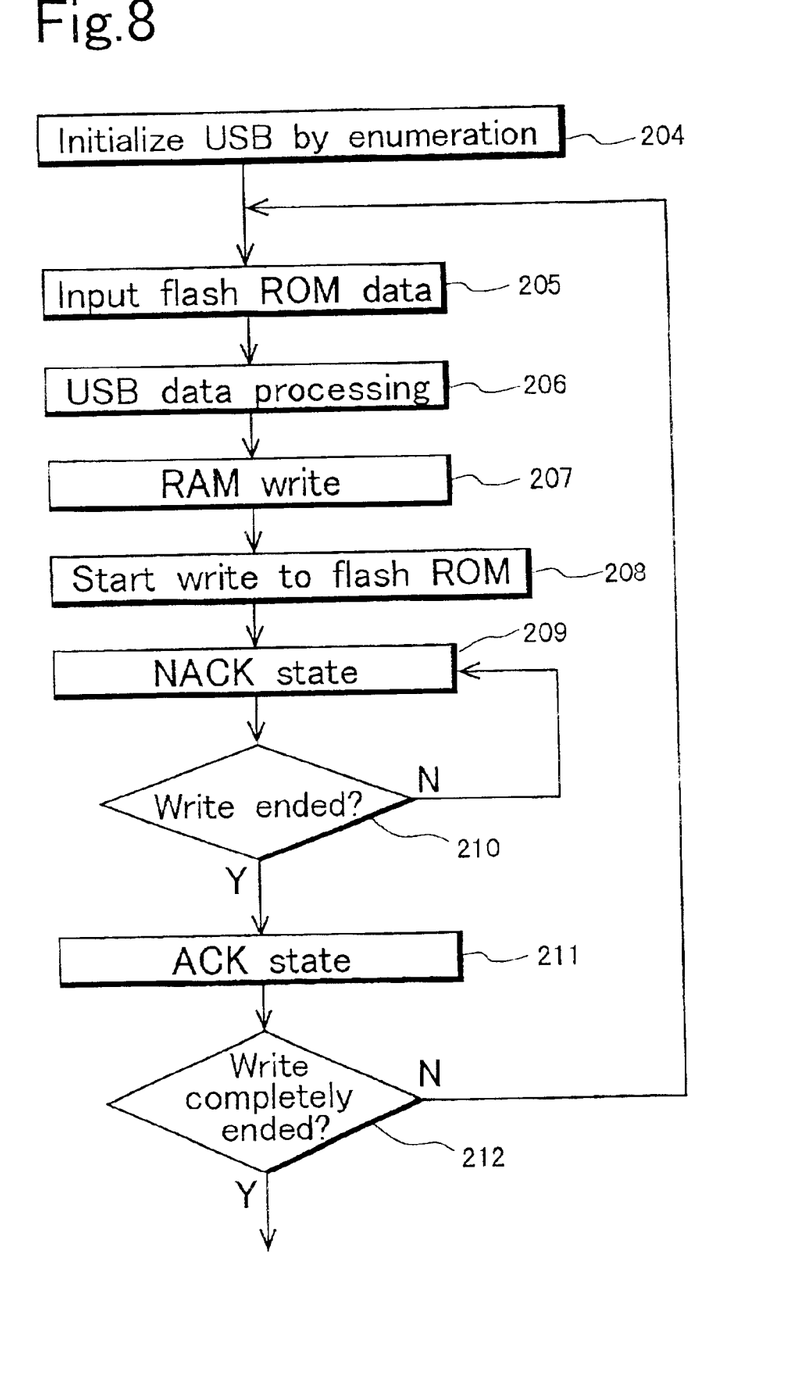
FIG. 8 is a flow chart showing the operation of the microcomputer 10 according to the third embodiment of the invention.

While the details of the step 215 are shown in a flow chart of FIG. 8, steps 205 to 212 are the same as those in the first embodiment shown in FIG. 3.

After the step 215 is executed, it is decided whether or not the program data are to be written again (step 221) in a process for the execution of a program written from the personal computer 100 (step 220). If the decision is YES, the processing returns to the step 203 where the program data are reloaded. Consequently, a countermeasure can be taken against the case in which the loading of the program data results in failure due to some communication error such as the disconnection of the USB cable.

Figure 7:
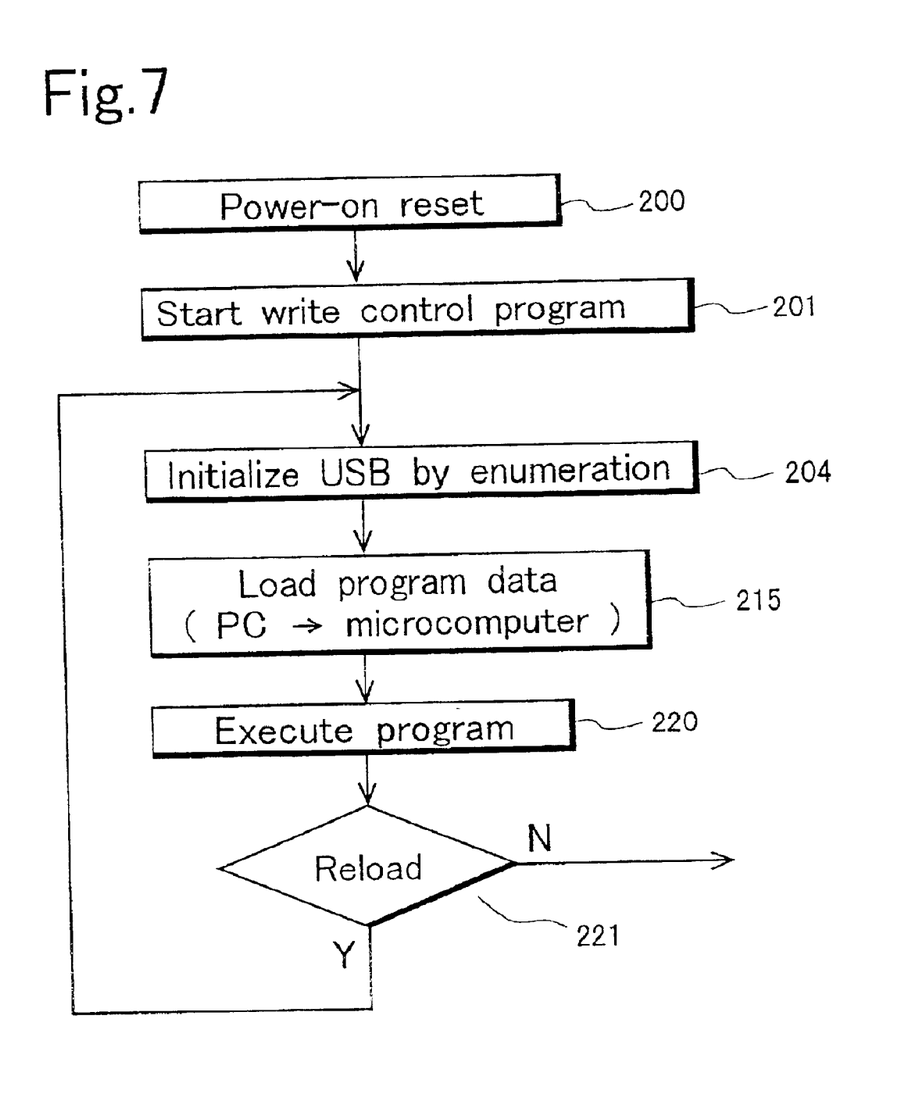
FIG. 7 is a flowchart showing the operation of a microcomputer 10 according to the third embodiment of the invention.

In the case in which the USB cable is disconnected from the microcomputer 10 to turn off a power and is connected again to turn on the power in an actual use state, there is a drawback that the write control program is activated and an unnecessary program step is executed in accordance with a flow chart of FIG. 7 irrespective of the fact that the program data to be executed have already been loaded. In order to eliminate the drawback, there is a method of switching two programs through an external jumper switch, which is very inconvenient for the user.

Figure 9:
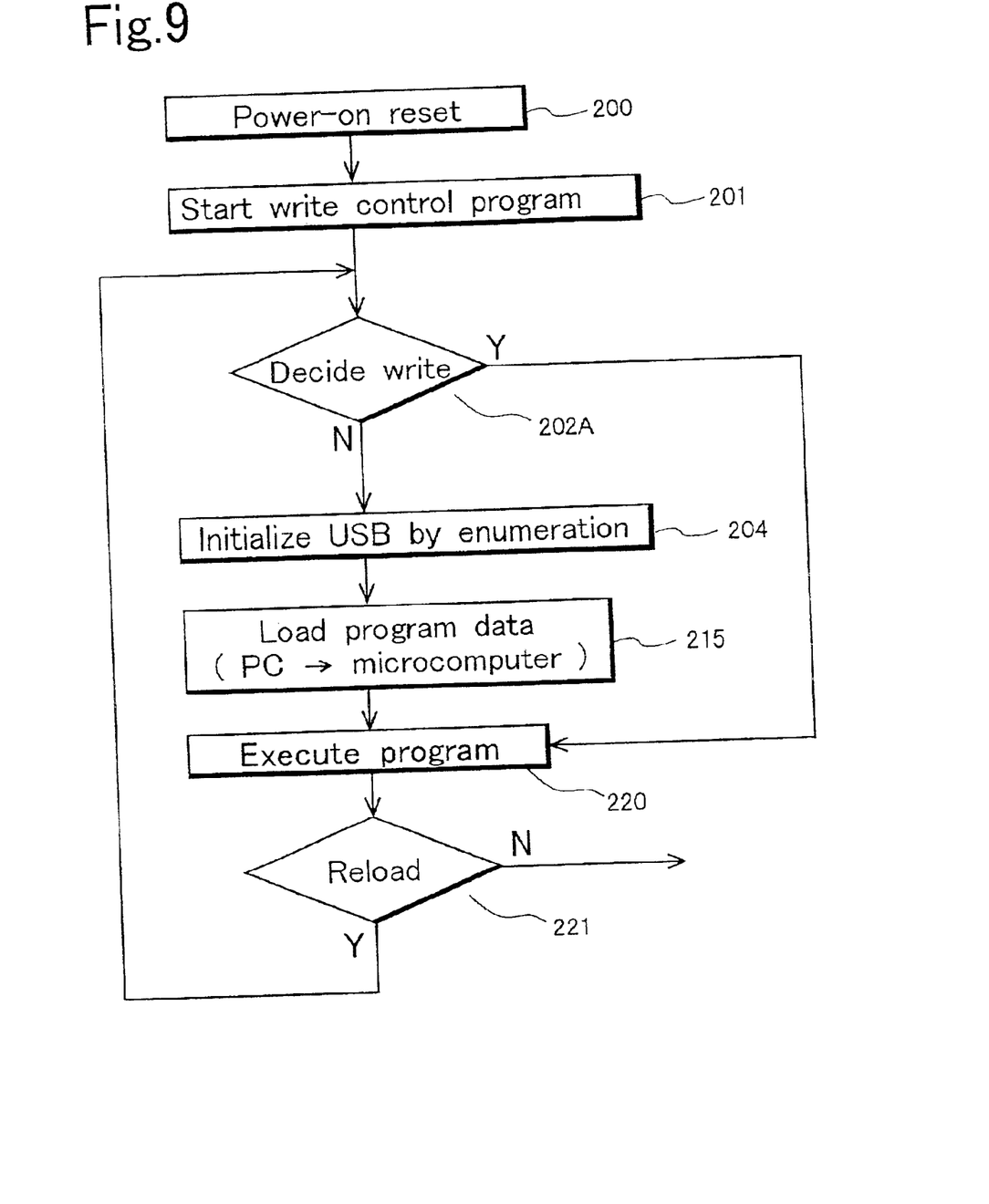
FIG. 9 is a flow chart showing the operation of the microcomputer 10 according to the third embodiment of the invention.

As shown in a flow chart of FIG. 9, therefore, there is a step 202A in which the write of program data is decided in the process for executing the write control program, more specifically, after the start of the write control program (step 201). In other words, the collating code data area 52A is provided in a part of the second program area 52.

The collating code data are written to the collating code data area 52A after the program data are written (step 218). As described above, the collating code data have a data volume of 128 Kbytes, for example, and may be previously written to a part of the first program area 53 or may be transmitted from the personal computer 100 together with the program data. At the step 202A, the data of the collating code data area 52A are read and compared with the collating code data which are previously written to the first program area 53 or stored in a predetermined register in the microcomputer. If they are coincident with each other, the microcomputer recognizes that the program data have already been written and executes the same program data without initializing the USB again.

On the other hand, if the data of the collating code data area 52A are not coincident with the collating code data, an operation for writing the program data is started after the initialization of the USB. Consequently, the two programs can be switched by a software so that the convenience of the user can be enhanced.

Moreover, in the case in which program data subjected to upgrade of the program version are to be rewritten again, the collating code data of the collating code data area 52A are rewritten or one bit thereof is deleted so that the results of collating decision are not coincident with each other. Thus, the reloading can be carried out.

According to the embodiment, thus, the collating code data are written to a partial area of the nonvolatile memory and whether the program data have already been written is determined by the write collating decision. Consequently, the write control program and the program to be executed can be switched by the software. Thus, there is an advantage that the convenience of the user can be enhanced.

What is claimed is:

1. A microcomputer comprising a USB interface circuit for interfacing data transmission and receipt between a host and the microcomputer, a nonvolatile memory for program storage which can electrically carry out rewrite and read, a data memory for temporarily storing program data transmitted from the host which are parallel convened by the USB interface circuit, and a CPU for executing a program instruction read from the nonvolatile memory, wherein the nonvolatile memory for program storage has a first program area storing a write control program and a second program area to which the program data are to be written, and the program data stored temporarily in the data memory are written to the second program area in accordance with the write control program stored in the first program area.

2. The microcomputer according to claim 1, further comprising a program counter for controlling an address of the nonvolatile memory for program storage, a value of the program counter being caused to jump to a starting address of the first program area in response to a reset of the microcomputer.

3. The microcomputer according to claim 1, wherein the data memory is a RAM.

4. The microcomputer according to claim 3, wherein the RAM is accessible from the USB interface circuit and the CPU.

5. The microcomputer according to claim 4, further comprising an address selecting circuit for selecting a first address signal output from the USB interface circuit and a second address signal output from the CPU and inputting the address signal to an address decoder of the RAM, a data area of the RAM being accessible from the USB interface circuit and the CPU.

6. The microcomputer according to claim 5, wherein the address selecting circuit selects the first address signal output from the USB interface circuit during receipt of data from the host.

7. A microcomputer comprising:
a USB interface circuit for interfacing data transmission and receipt between a host and the microcomputer;
a temporary register for transmission and receipt which is provided in the USB interface circuit and serves to temporarily store data; and
a RAM which is accessible from the CPU and the temporary register for transmission and receipt in the microcomputer,
wherein data transfer is carried out between the temporary register and the RAM.

8. The microcomputer according to claim 7, further comprising an address selecting circuit for selecting a first address signal output from the USB interface circuit and a second address signal output from the CPU and inputting the address signal to an address decoder of the RAM, a data area of the RAM being accessible from the USB interface circuit and the CPU.

9. The microcomputer according to claim 8, wherein the address selecting circuit selects the first address signal output from the USB interface circuit during receipt of data from the host.

10. A microcomputer comprising a USB interface circuit for interfacing data transmission and receipt between a host and the microcomputer, a nonvolatile memory for program storage which can electrically carry out rewrite and read, and a CPU for executing a program read from the nonvolatile memory, wherein a specific memory area for storing identification information to specify a vendor of the microcomputer is provided in the nonvolatile memory and the identification information read from the specific memory area is transmitted to the host through the USB interface circuit during initialization of a USB, and wherein the nonvolatile memory has a first program area storing a write control program and a second program area to which program data are to be written, and the program data are written to the second program area in accordance with the write control program stored in the first program area.

11. The microcomputer according to claim 10, wherein the specific memory area of the nonvolatile memory in which the identification information is to be stored is provided adjacently to the first program area.

12. A method of controlling a microcomputer comprising a USB interface circuit for interfacing data transmission and receipt between a host and the microcomputer, a nonvolatile memory having a first program area storing a write control program and a second program area to which program data are to be written and capable of electrically carrying out rewrite and read, and a CPU for executing a program read from the nonvolatile memory, comprising:
a first step of starting execution of the write control program in response to a reset of the microcomputer, a second step of executing initialization of a USB, a third step of writing program data from the host to the second program area of the nonvolatile memory, and a fourth step of executing a program written to the second program area.

13. A method of controlling a microcomputer according to claim 12, wherein the microcomputer is reset by power-on reset.

14. A method of controlling a microcomputer according to claim 12, comprising a step of deciding whether or not program data are to be rewritten from the host after the fourth step, wherein when the rewrite is to be carried out, the first to fourth steps are repeated again to rewrite the program data from the host to the second program area of the nonvolatile memory and to execute a program thus rewritten.

15. A method of controlling a microcomputer according to claim 12, further comprising a step of writing collating code data to a specific area in the second program area after the third step and a step of comparing data in the specific area with the collating code data after the first step, the third step being executed if both of them are not coincident with each other and program data are not rewritten from the host to the second program area of the nonvolatile memory but a program written to the second program area is executed if both of them are coincident with each other.

* * * * *